April 25, 1939.　　　B. J. ANDERSON　　　2,155,921
VEHICLE WHEEL
Filed Jan. 15, 1936
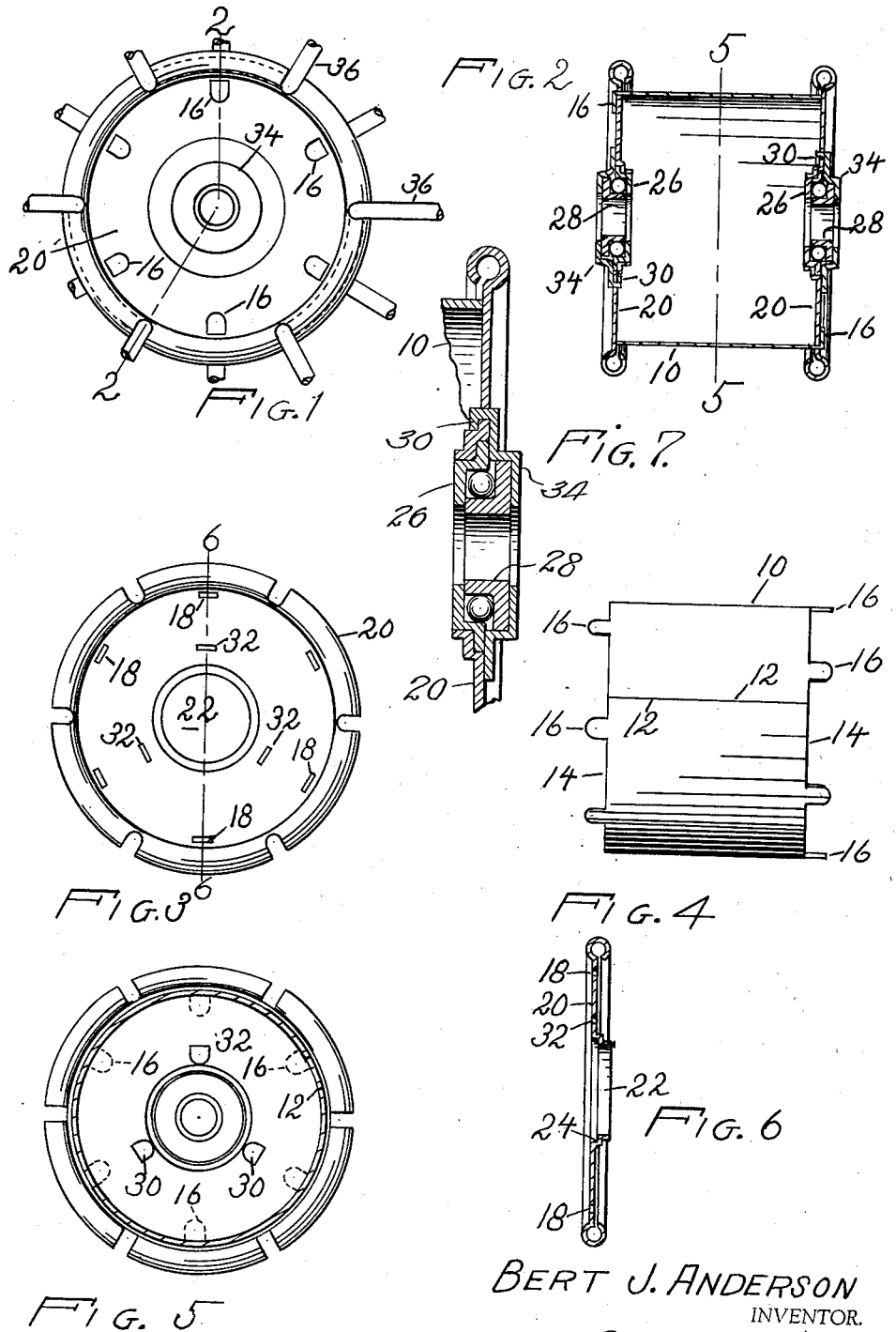
BERT J. ANDERSON
INVENTOR.
BY Leon T. Hooper
ATTORNEY.

Patented Apr. 25, 1939

2,155,921

UNITED STATES PATENT OFFICE 2,155,921

VEHICLE WHEEL

Bert J. Anderson, Hammond, Ind.

Application January 15, 1936, Serial No. 59,303

4 Claims. (Cl. 301—105)

This invention relates to an improved vehicle wheel and has for one of its principal objects the provision of means for economically producing a rugged and sturdy article, consisting of a limited number of coacting parts.

A still further important object of advantage of the wheel of this invention resides in the fact that the parts thereof, being small, may be struck up from what heretofore has been classed as scrap material.

Another object of importance and advantage of the invention resides in the provision of means whereby bolts, nuts, rivets and the like are entirely eliminated in the construction of the article.

Additional objects of importance and advantage will be apparent as the following detailed description progresses, reference being had to the accompanying drawing, wherein Fig. 1 is a side elevational view of the hub portion of a wheel which embodies the invention.

Fig. 2 is a section taken on line 2—2 of Fig. 1.

Fig. 3 is an elevation of a spoke clip.

Fig. 4 is a front elevation of a hub barrel.

Fig. 5 is a section taken on line 5—5 of Fig. 2.

Fig. 6 is a section taken on line 6—6 of Fig. 3.

Fig. 7 is a slightly enlarged fragmental section taken through the bearing assembly.

As shown in the drawing:

The reference numeral 10 indicates in general a hub barrel which in the preferred embodiment of the invention is struck up from a blank and is then curled into annular formation with the edges 12 in abutment.

Formed of portions of the edges 14 of each end of the barrel 10 is a plurality of securing tongues 16. The tongues 16 on each end of the barrel are equally spaced, as is best shown in Fig. 1.

However, the tongues 16 on one end of the barrel 10 are located in staggered relation with respect to the tongues on the opposite end of the barrel, as is clearly shown in Fig. 4. This construction, in addition to providing a very rugged and sturdy article, also permits standardization of parts throughout.

Positioned on each end of the barrel 10 by inserting the tongues 16 in the registering slots 18 is a spoke clip 20. The spoke clips 20 are maintained in assembly with the barrel 10 by crimping the tongues 16 toward the center of the clip, as is best shown in Figs. 1 and 2.

Each spoke slip 20 is centrally apertured 22 and the metal immediately surrounding the aperture is depressed to form an annular recess 24.

Positioned within each annular recess 24 and secured against independent rotation is a bearing cup 26. Rotatably positioned within each bearing cup 24 with ball bearings therebetween is an inner cone 28.

Secured to each spoke clip 20 by a plurality of tongues 30 coacting with registering slots 32 in the spoke clip is a retaining washer 34. The washer 34 provides a means for maintaining the entire ball bearing assembly in operable position in the annular recess 24.

Conventional wire spokes 36 are preferably used in the construction of the improved wheel of this invention and are therefore shown in part only in the drawing. The peripheral edge of each spoke clip 20 being curled over a portion of the spokes, as is clearly shown in the drawing, secures spoke and spoke clip together.

It will be apparent from the foregoing that herein is provided an improved ball bearing wheel which may be maintained in assembly by the co-operation of various parts thereof. Moreover, because of the elimination of bolts, nuts, rivets and the like, which are customarily used as a securing member in maintaining the parts in assembly, and because of the limited number of machine operations required, the device here described may be very economically produced.

I claim as my invention:

1. In a wheel, a hub barrel formed of sheet metal and having a plurality of tongues formed on each end thereof, an apertured spoke clip secured to each end of said hub barrel, each of said spoke clips having two concentric rows of tongue receiving slots therein, a bearing washer and said hub barrel being secured to the inner and outer rows of slots in the hub clip respectively, the peripherial edge of each spoke clip being curled into tubular formation and having a plurality of spokes secured therein, an apertured washer having a plurality of tongues formed at its peripheral edge secured to each spoke clip, and an anti-friction bearing assembly positioned between the opposed surfaces of each spoke clip and said apertured washers.

2. In a wheel, a hub barrel, a pair of apertured spoke clips each having a plurality of spaced slots adjacent its outer edge and a plurality of spaced slots adajacent said aperture, said spoke clips being positioned one on each end of said hub barrel, portions of said hub barrel extending through the spaced slots in each spoke clip and being crimped thereagainst, an apertured washer having a depressed central portion and a plurality of spaced tongues at the outer edge thereof secured to each spoke clip, said tongues being inserted through said second named slots and crimped against the inner surface of said clip, and an anti-friction bearing assembly positioned in the depressed central portion of said washer.

3. In a wheel, a hub barrel, a pair of apertured spoke clips each having a plurality of spaced slots adjacent its outer edge, said outer edge being curled into cylindrical formation, said spoke clips being positioned one on each end of said hub barrel, portions of said hub barrel extending through the spaced slots in each spoke clip and being crimped thereagainst, a ball bearing assembly positioned in alignment with the aperture in each spoke clip, and means for maintaining said ball bearing assemblies in alignment with said apertures and each other, said means comprising a centrally located recess in each spoke clip, each recess being adapted to receive a ball bearing assembly, and a retaining washer secured to the outer central surface of each spoke clip.

4. In a hub assembly for a wheel comprising, a hub barrel consisting of a stamping curled into tubular formation and having a plurality of tongues projecting outwardly from each end thereof, a pair of spoke clips each being apertured and having a plurality of slots adapted to receive said tongues positioned one on each end of said hub barrel, means for securing a plurality of spokes to the outer edge of each spoke clip, and means for securing a ball bearing assembly to the central portion of each spoke clip, said last named means comprising a receptacle positioned between the spoke clip and a retaining washer.

BERT J. ANDERSON.